United States Patent
Shoda et al.

(10) Patent No.: US 8,141,499 B2
(45) Date of Patent: Mar. 27, 2012

(54) WIRELESS ACTUATOR

(75) Inventors: Kazuo Shoda, Tokyo (JP); Tomoyuki Oizumi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 582 days.

(21) Appl. No.: 12/095,012

(22) PCT Filed: Nov. 13, 2006

(86) PCT No.: PCT/JP2006/322543
§ 371 (c)(1),
(2), (4) Date: Jun. 23, 2009

(87) PCT Pub. No.: WO2007/063693
PCT Pub. Date: Jun. 7, 2007

(65) Prior Publication Data
US 2010/0031856 A1   Feb. 11, 2010

(30) Foreign Application Priority Data
Nov. 30, 2005   (JP) .................................. 2005-345547

(51) Int. Cl.
*A47B 85/00* (2006.01)

(52) U.S. Cl. ........................................ 108/20; 108/143

(58) Field of Classification Search ............... 108/20, 108/21, 22, 147, 143, 7, 50.01, 50.02; 320/108; 74/16
See application file for complete search history.

(56) References Cited

U.S. PATENT DOCUMENTS

| | | | | | |
|---|---|---|---|---|---|
| 5,309,847 | A | * | 5/1994 | Matsumoto | 108/143 |
| 5,326,335 | A | * | 7/1994 | Takei | 108/143 |
| 5,329,825 | A | * | 7/1994 | Askins | 108/143 |
| 5,357,819 | A | * | 10/1994 | Takei | 108/143 |
| 5,533,844 | A | * | 7/1996 | Ekleberry | 108/143 |
| 5,575,565 | A | * | 11/1996 | Takei et al. | 384/45 |
| 5,609,107 | A | * | 3/1997 | Viola et al. | 105/77 |
| 5,678,663 | A | * | 10/1997 | Watanabe et al. | 188/67 |
| 5,681,116 | A | * | 10/1997 | Lin | 384/42 |

(Continued)

FOREIGN PATENT DOCUMENTS

JP   8-140331 A   5/1996
(Continued)

OTHER PUBLICATIONS

International Search Report of PCT/JP2006/322543, date of mailing Jan. 23, 2007.

*Primary Examiner* — Jose V Chen
(74) *Attorney, Agent, or Firm* — Westerman, Hattori, Daniels & Adrian, LLP; William F. Westerman

(57) ABSTRACT

A wireless actuator includes a track rail, a slide member movable along the track rail, a driver which is mounted on the slide member and which allows the slide member to travel with respect to the track rail, a radio receiver portion which is mounted on the slide member and which receives a drive control signal for the driver, a control unit which generates the drive control signal and transmits the drive control signal to the radio receiver portion, and a non-contact power supply which includes a primary side member provided to the track rail and a secondary side member provided to the slide member and supplies electric power from a side of the track rail to the driver and the radio receiver portion which are mounted on the slide member.

9 Claims, 10 Drawing Sheets

U.S. PATENT DOCUMENTS

| | | | |
|---|---|---|---|
| 5,996,437 A * | 12/1999 | Novak et al. | 108/143 |
| 6,462,500 B1 * | 10/2002 | L'Hegarat et al. | 108/20 |
| 6,986,556 B2 * | 1/2006 | Haberman | 108/143 |
| 7,059,370 B2 | 6/2006 | Wang | 108/143 |
| 7,106,014 B1 * | 9/2006 | Mastalir et al. | 108/44 |
| 7,636,966 B2 * | 12/2009 | Gallant et al. | 108/49 |
| 7,677,678 B2 * | 3/2010 | Mosel et al. | 108/7 |
| 7,823,973 B2 * | 11/2010 | Dragusin | 108/50.01 |
| 2002/0084389 A1 * | 7/2002 | Larson | 108/147 |
| 2004/0060482 A1 * | 4/2004 | Torcheboeuf | 108/143 |
| 2004/0083933 A1 * | 5/2004 | Baric et al. | 108/143 |
| 2005/0217540 A1 * | 10/2005 | Novak | 108/50.01 |
| 2006/0086293 A1 * | 4/2006 | Ryaboy et al. | 108/161 |
| 2006/0162626 A1 * | 7/2006 | Brauning et al. | 108/143 |
| 2007/0227409 A1 * | 10/2007 | Chu | 108/50.02 |
| 2008/0245279 A1 * | 10/2008 | Pan | 108/144.11 |
| 2008/0250985 A1 * | 10/2008 | Hall | 108/50.11 |
| 2009/0014932 A1 * | 1/2009 | Nikaido et al. | 108/143 |

FOREIGN PATENT DOCUMENTS

| | | |
|---|---|---|
| JP | 2000-159306 A | 6/2000 |
| JP | 2002-136159 A | 5/2002 |

* cited by examiner

WIRELESS ACTUATOR

TECHNICAL FIELD

The present invention relates to an actuator which is used for various conveying apparatuses, machine tools, measurement devices, industrial robots, or the like and which has a structure in which a movable table freely travels on a base in response to a control signal, the movable table having a drive means such as a linear motor mounted thereon.

BACKGROUND ART

Conventionally, there is known an actuator having a structure in which a movable table movably supported on the base is allowed to arbitrarily reciprocate depending on an objective control amount. The actuator is widely used for various conveying apparatuses, machine tools, measurement devices, industrial robots, or the like. As the actuator, there are suggested actuators of various types. Based on a difference in structure for imparting a thrust force to the movable table, the actuators can be roughly divided into two types. One of those is a type in which a drive source such as a rotary motor or a linear motor is disposed on a base to impart a thrust force from the base side to the movable table. Another of those is a type in which the drive source is mounted on the movable table to allow the movable table to travel by itself with respect to the base.

In the former type, when a plurality of movable tables having different control amounts are required, it is necessary that the drive sources in the number corresponding to the number of the movable tables be provided on the base, and it is extremely difficult that the plurality of movable tables having different control amounts exist in a single movement path on the base. Further, it is also necessary that, in an entire region of the movement path of each of the movable tables on the base, a force generated by the drive source has to be transmitted to the movable table, and when a moving range of the movable table is wide, machining of the base consumes labor and costs. In contrast, in the latter self-traveling type, the drive source itself is mounted on the movable table. Accordingly, even when the plurality of movable tables exist in the single movement path on the base, an independent control amount can be provided to each of the movable tables. Further, machining of the base becomes relatively easy. Accordingly, there is an advantage in that, even when the movement path of the movable table is long, the labor and increase in cost for machining the base can be suppressed.

However, in the latter self-traveling type, it is necessary that electric power be supplied to the drive source mounted on the movable table and a control signal corresponding to an objective control amount be supplied to the movable table. Accordingly, there is a need for connecting a power supply cable and a signal cable to the movable table. Therefore, the movable table has to be moved on the base while continuously dragging the cables. Accordingly, there is a problem in that, when the movement path of the movable table is long, the cables tend to inhibit the movement of the movable table.

On the other hand, as a so-called wireless actuator which is a self-traveling actuator having the drive source mounted on the movable table, and capable of imparting an objective control amount to the movable table without using the power supply cable and the signal cable, there is known a cargo transfer device as disclosed in JP2000-159306A. In the cargo transfer device, a linear motor is mounted on a movable fork which is provided so as to be movable with respect to a base. By driving the linear motor, the movable fork can be allowed to advance and retreat on the base in an arbitrary manner. Electric power is supplied to the linear motor on the movable fork by a non-contact power supply means provided between the base and the movable fork. Specifically, a primary side core constituting the non-contact power supply means is provided to the base, a secondary side core constituting the non-contact power supply means is provided to the movable fork, and an induced electromotive force of the secondary side core, which is generated by electrification of the primary side core, is supplied to the linear motor.

DISCLOSURE OF THE INVENTION

Problems To Be Solved by the Invention

However, in the cargo transfer device as disclosed in JP 2000-159306 A, the secondary side core provided to the movable fork and a coil member of the linear motor are directly connected to each other. By changing a direction of electrification for the primary side core provided to the base, a direction of the induced electromotive force generated in the secondary side core is reversed. Along with this, a direction of a current flowing through the coil member of the linear motor is changed and a moving direction of the movable fork with respect to the base is reversed. That is, the non-contact power supply means supplies electric power to the linear motor of the movable fork and also controls the linear motor at the same time.

Accordingly, in the case of providing the plurality of movable tables to the base, it is necessary that the non-contact power supply means be provided to each of the movable tables. In this case, it is extremely difficult that the plurality of movable tables having different control amounts exist in the single movement path on the base. Further, there is also a problem in that, even when the plurality of movable tables exist therein, the actuator itself tends to be larger.

Means for Solving the Problems

The present invention is made in view of the above-mentioned problems. It is an object of the present invention to provide a wireless actuator having a structure in which without connecting a power supply cable and a signal cable to a movable table, movement of the movable table can be controlled on a base, and even when the plurality of movable tables are provided, each of the movable tables can be independently controlled.

A wireless actuator according to the present invention achieving the above-mentioned object includes a base and a movable table which is movable on the base. The base includes a track rail disposed along a predetermined path. On the other hand, the movable table includes a slide member assembled to the track rail through intermediation of multiple balls. On the movable table, there are mounted a drive means which allows the movable table to travel with respect to the track rail and a radio receiver portion which receives a drive control signal for the drive means. Further, a control unit which generates a drive control signal for the drive means is not mounted on the movable table and wirelessly transmits the drive control signal to the radio receiver portion mounted on the movable table. Electric power is supplied to the drive means and the radio receiver portion which are mounted on the movable table by a non-contact power supply means. The non-contact power supply means includes a primary side member provided to the base and a secondary side member provided to the movable table.

According to the wireless actuator according to the present invention, electric power is supplied by the non-contact power supply means to the drive means and the radio receiver portion which are mounted on the movable table. Without connecting the power supply cable to the movable table, the movable table can be allowed to travel on the base. Further, the drive control signal for controlling the drive means is wirelessly transmitted to the radio receiver portion mounted on the movable table. Accordingly, without connecting the signal cable to the movable table, the movable table can be allowed to travel on the base depending on the objective control amount. That is, there is no need of connecting cables to the movable table at all. Even in a case where a movement path of the movable table is long, the movable table can be allowed to travel without any trouble.

Particularly, since the drive control signal is wirelessly transmitted to the radio receiver portion mounted on the movable table, even in a case where a plurality of movable tables having different control amounts exist in the single movement path on the base, each of the movable tables can be allowed to independently travel. As a result, by using the actuator, various conveying apparatuses or the like can be downsized.

REFERENCE NUMERALS

1 . . . base, 2 . . . movable table, 4 . . . drive means, 5 . . . non-contact power supply means, 6 . . . control unit, 9 . . . secondary battery, 30, 80 . . . track rail, 31, 81 . . . slide member, 50 . . . primary side member, 51 . . . secondary side member, 70 . . . radio receiver portion.

BEST MODES FOR CARRYING OUT THE INVENTION

Hereinafter, with reference to the attached drawings, a detailed description is made of a wireless actuator of the present invention.

Figure 1:
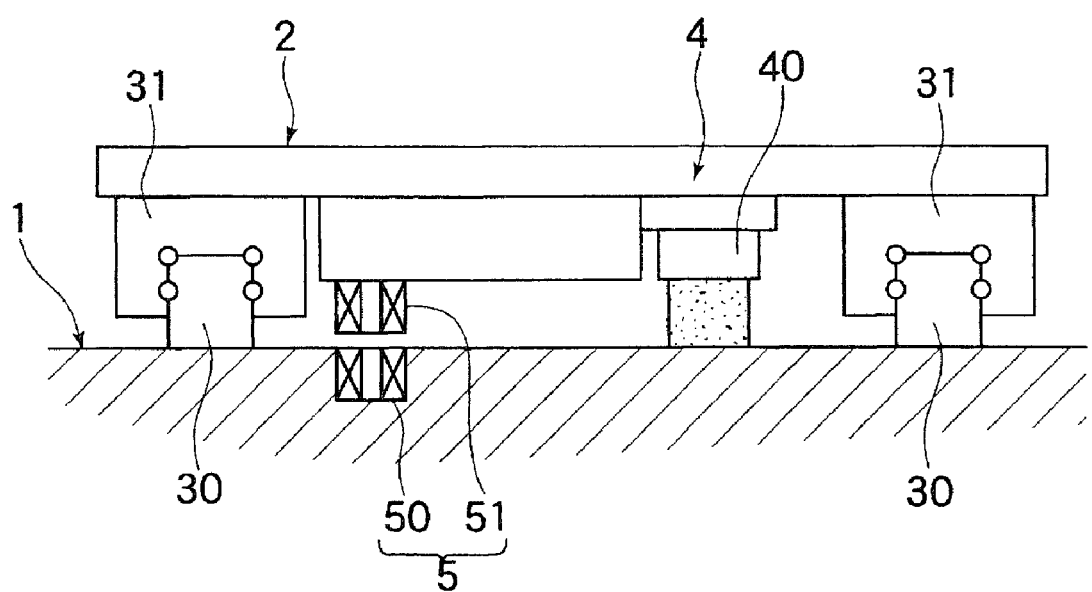
FIG. 1 is a front view schematically illustrating a wireless actuator according to a first embodiment of the present invention.
Figure 2:
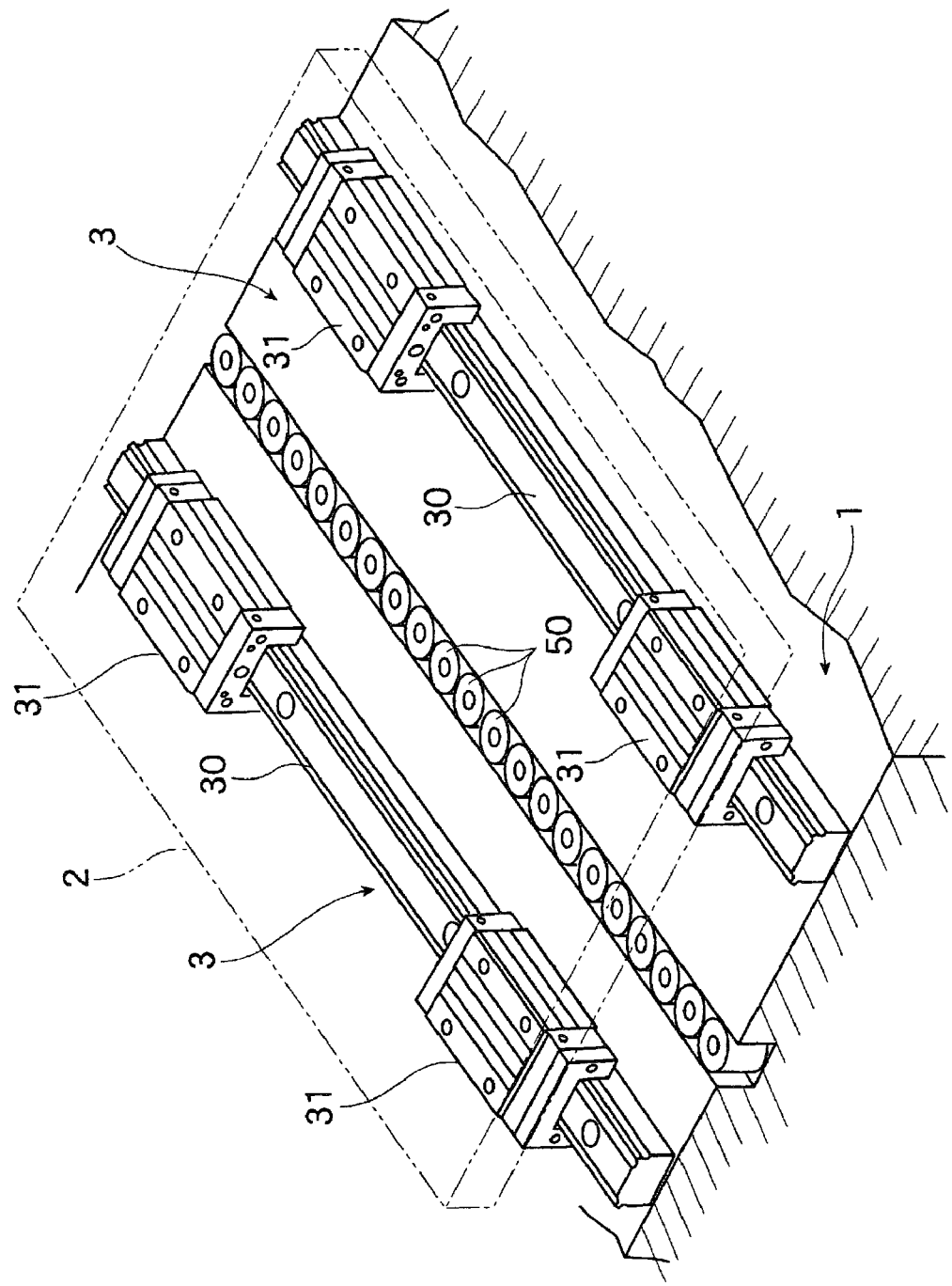
FIG. 2 is a perspective view illustrating a guiding structure of a movable table according to the first embodiment of the present invention.

FIG. 1 is a front view illustrating a wireless actuator according to a first embodiment of the present invention. The wireless actuator according to the first embodiment of the present invention includes a base 1 and a movable table 2 which freely moves with respect to the base 1. As illustrated in FIG. 2, the movable table 2 is supported on the base 1 by using biaxial linear guides 3 which are arranged parallel to each other. Each of the linear guides 3 includes a track rail 30 fixed to the base 1 by bolts and slide members 31 assembled to the track rail 30 through intermediation of multiple balls. The slide members 31 can freely reciprocate along the track rails 30. The two slide members 31 are assembled to each of the track rails 30. The movable table 2 is fixed to the four slide members 31 and freely reciprocates linearly along the track rails 30.

Note that, depending on a load and a size of the movable table 2 required for the movable table 2, the number of the slide member 31 may be one for each of the track rails 30. Further, the number of threads of the track rail 30 may be appropriately changed depending on the load required for the movable table 2.

Figure 3:
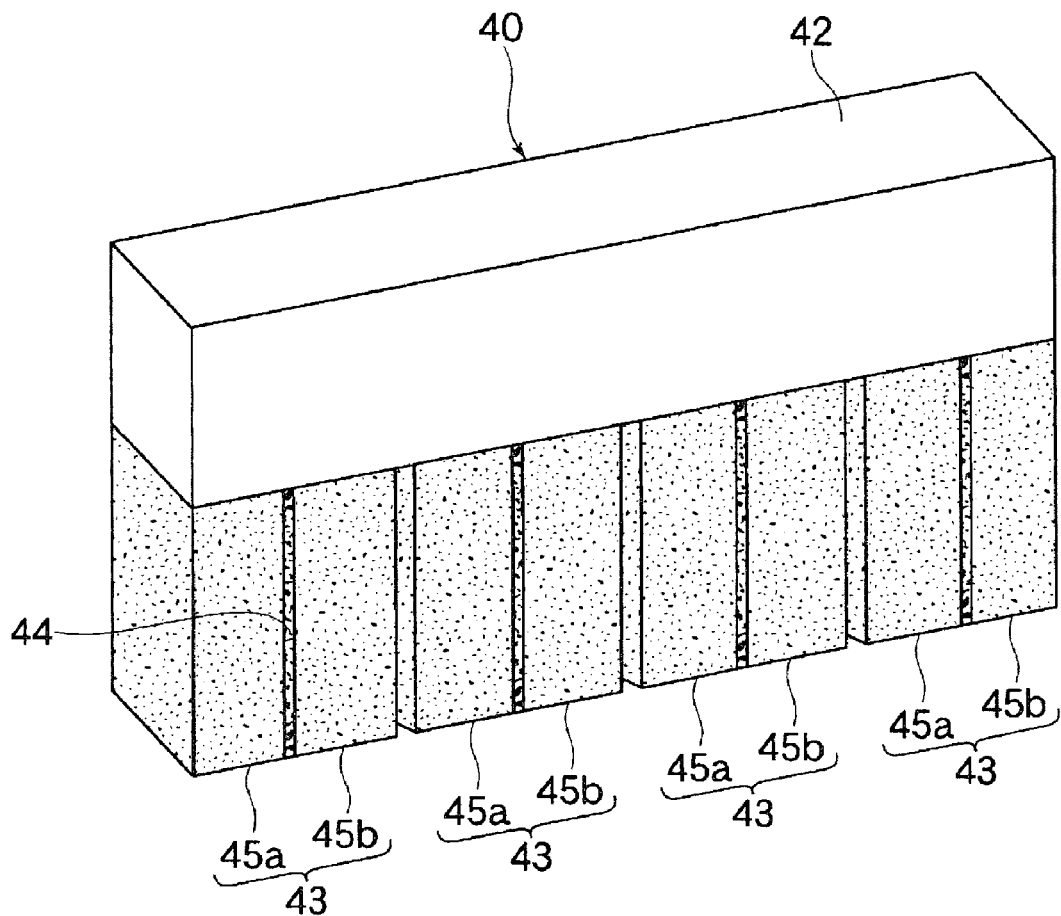
FIG. 3 is a perspective view illustrating a piezo linear motor which is an example of a drive means.

On a lower surface of the movable table 2 between the pair of linear guides 3, there is provided a drive means 4 which allows the movable table 2 to travel along the track rails 30. The drive means 4 exerts a thrust force along a longitudinal direction of the track rails 30, thereby advancing and retreating the movable table 2 with respect to the base 1. For example, the drive means 4 includes a piezo linear motor 40 illustrated in FIG. 3 and a driver circuit 41 for controlling an operation of the piezo linear motor 40.

The piezo linear motor 40 includes four drive legs 43 formed of piezoelectric ceramics on an insulating substrate 42. While the insulating substrate 42 is fixed to the lower surface of the movable table 2, tip portions of the drive legs 43 are brought into contact with the base 1. The four drive legs 43 are arranged along a moving direction of the movable table 2 with respect to the base 1. Each of the drive legs 43 is obtained by bonding a pair of piezoelectric ceramics 45a and 45b to each other through intermediation of an insulation sheet 44, thereby constituting bimorph. By shifting timings of applying voltages to the piezoelectric ceramics 45a and 45b positioned on both sides of the insulation sheet 44, the drive leg 43 can be freely bent in the bonding direction of the pair of piezoelectric ceramics 45a and 45b. As the piezo linear motor 40, for example, Piezo LEGS (trade name) manufactured by PiezoMotor can be used.

Figure 4:
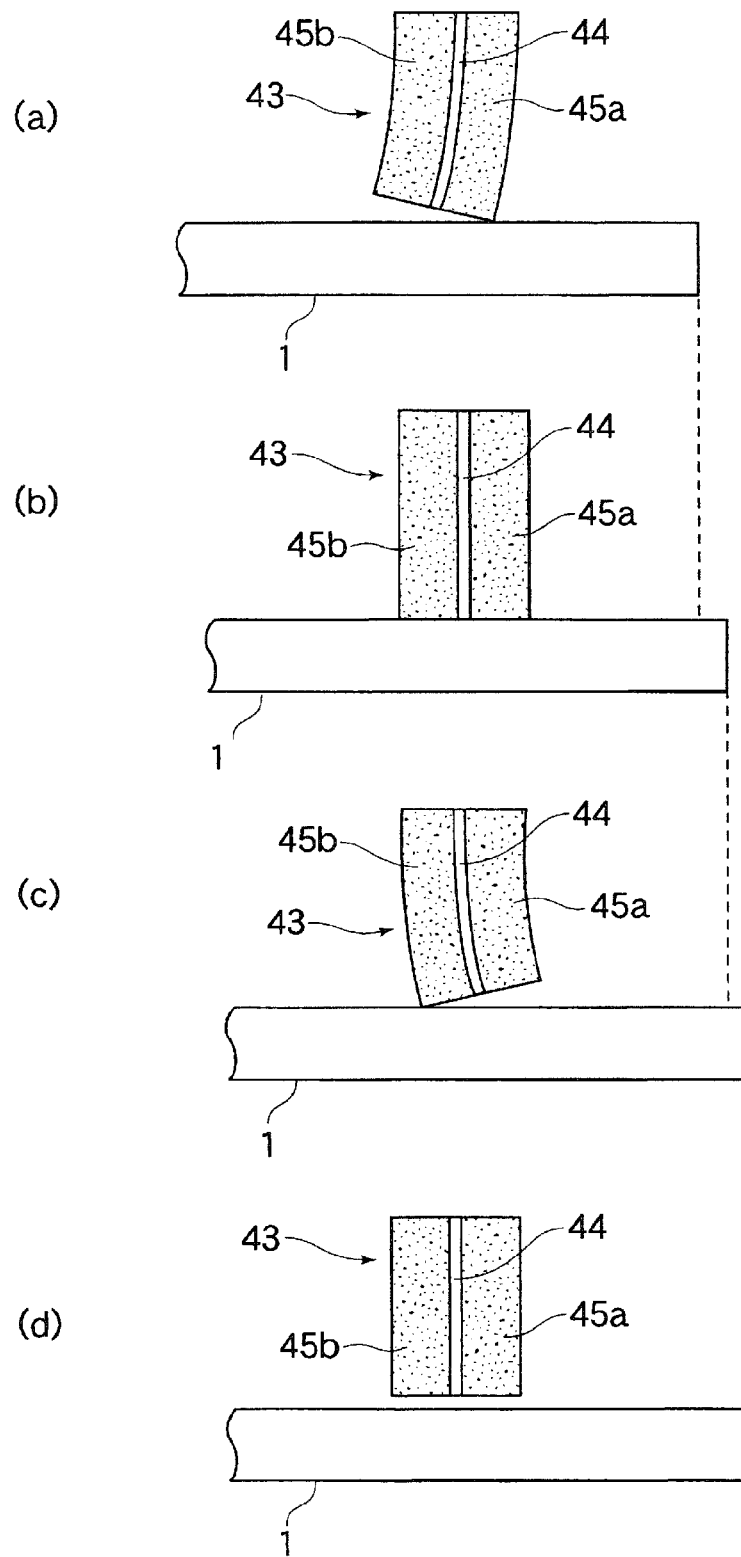
FIG. 4 are explanatory views illustrating operations of the piezo linear motor in sequence.

FIG. 4 are views illustrating a state where the drive leg 43 advances on the base 1. The piezoelectric ceramics 45a and 45b extend and contract by being applied with voltages. However, as illustrated in FIG. 4(a), when the voltage is applied to the one piezoelectric ceramics 45a of the pair of piezoelectric ceramics 45a and 45b constituting the drive leg 43, the drive leg 43 is bent in a direction opposed to the piezoelectric ceramics 45a to which the voltage is applied. As a result, a tip of the piezoelectric ceramics 45a is brought into contact with the base 1. Next, when the voltage is applied to both the piezoelectric ceramics 45a and 45b, as illustrated in FIG.

4(b), the drive leg 43 extends to be restored from the bent state, and the drive leg 43 presses the base 1 toward a surface direction thereof. Further, when application of the voltage with respect to the piezoelectric ceramics 45a, to which the voltage is first applied, is stopped, as illustrated in FIG. 4(c), the drive leg 43 is bent in the opposite direction to that of FIG. 4(a). As a result, the base 1 is further pushed in the same direction as in the case of FIG. 4(b). When application of the voltage to both the piezoelectric ceramics 45a and 45b is stopped, as illustrated in FIG. 4(d), the drive leg 43 contracts to be an original state and resolves the bent state. Accordingly, the tip portion of each of the drive legs 43 is spaced apart from the base 1. Therefore, by repeating a cycle illustrated in FIGS. 4(a) to 4(d), the base 1 can be pushed into one direction. In other words, the drive legs 43 advance with respect to the base 1. Further, by changing an order of applying the voltage to the pair of piezoelectric ceramics 45a and 45b constituting the drive leg 43, the base 1 can also be pushed in the opposite direction. Further, in a case where the base 1 is pushed by the single drive leg 43, the base 1 is pushed intermittently based on the cycle illustrated in FIG. 4. However, since the piezo linear motor 40 of this embodiment is provided with the four drive legs 43, by shifting phases of the voltage application with respect to the drive legs 43, the base 1 can be uninterupted and continuously pushed in one direction.

Accordingly, by adjusting the application timing of the voltage to the four drive legs 43 provided to the piezo linear motor 40, the piezo linear motor 40 fixed to the movable table 2 generates a thrust force along the longitudinal direction of the track rails 1, thereby making it possible to freely advance and retreat the movable table 2 with respect to the base 1. In this case, the driver circuit 41 controls the timings of applying voltages to the piezoelectric ceramics 45a and 45b constituting each of the drive legs 43 depending on an objective control amount, that is, a moving distance, a moving direction, a moving speed, and the like of the movable table 2.

The drive means 4 for thrusting the movable table 2 with respect to the base 1 is not limited to the piezo linear motor 40 and there may be used a commonly known linear synchronous motor, linear induction motor, linear stepping motor, or the like. Further, there may be employed a structure in which a drive wheel to which rotation is imparted by a motor is mounted on the movable table 2, the drive wheel is brought into press contact with the base 1, and the rotation of the motor is controlled by the driver circuit.

Figure 5:
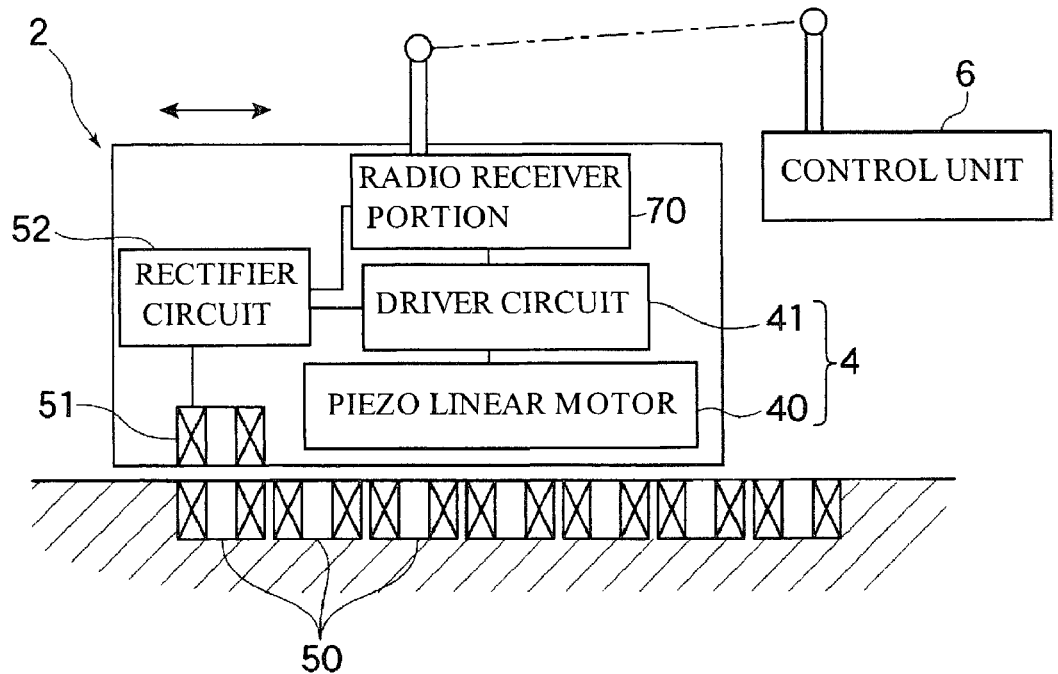
FIG. 5 is a block diagram illustrating elements mounted on the movable table according to the first embodiment of the present invention.

In order for the driver circuit 41 to drive the piezo linear motor 40, it is necessary that electric power be supplied to the driver circuit 41. Accordingly, between the base 1 and the movable table 2, a non-contact power supply means 5 is provided. The non-contact power supply means 5 includes a primary side member 50 provided to the base 1 and a secondary side member 51 fixed to the lower surface of the movable table 2. Without bringing the primary side member 50 and the secondary side member 51 into contact with each other, electric power can be transferred therebetween by a so-called electromagnetic induction method. As illustrated in FIG. 2, the primary side member 50 is obtained by arranging coils each having an iron core along a longitudinal direction of the track rails 30, and the coils 50 are connected to an AC power supply in parallel to each other. Further, each of the coils 50 is disposed so as to generate a magnetic flux perpendicularly to an upper surface of the base 1 when being electrified. On the other hand, as illustrated in FIG. 5, the secondary side member 51 is a single coil having an iron core, which is fixed to the movable table 2 at a position opposed to the primary side member 50. The secondary side member 51 is disposed such that, even when the movable table 2 moves on the base 1, the secondary side member 51 is opposed to any one of the coils of the primary side member 50.

When an AC voltage is applied to each of the coils of the primary side member 50, the magnetic flux is generated in a direction perpendicular to the upper surface of the base 1. Accordingly, owing to Faraday's law, an electromotive force is generated in the coil of the secondary side member 51 opposed to the coil of the primary side member 50, and an AC voltage can be taken out from the coil of the secondary side member 51. Note that the driver circuit 41 requires a DC power source. Accordingly, as illustrated in a block diagram of FIG. 5, a rectifier circuit 52 is connected to the coil of the secondary side member 51 to convert the AC voltage into a DC voltage, and after adjusting the DC voltage to a predetermined magnitude, the DC voltage is applied to the driver circuit 41. Note that an arrow of FIG. 5 indicates directions of the reciprocating movement of the movable table.

Further, the primary side member 50 is provided on the base 1 over an entire length of a movement path of the movable table 2. Even when the movable table 2 is moved on the base 1, electric power is always transferred from the base 1 side to the movable table 2 side, and the electric power can be supplied to the driver circuit 41 of the drive means 4. As a matter of course, since the plurality of coils constituting the primary side member 50 are repeatedly arranged on the base 1, depending on a travel position of the movable table 2 on the base 1, the coil of the secondary side member 51 may not be correctly opposed to the coil of the primary side member 50 in some cases. However, with provision of a smoothing capacitor to the rectifier circuit 52, a stable DC voltage can be taken out.

Further, in order to increase an electric power amount transferred from the base 1 to the movable table 2, a plurality of coils may be arranged on the movable table 2 as the secondary side member 51.

On the other hand, in order for the driver circuit 41 of the drive means 4 to control an operation of the piezo linear motor 40, it is necessary that information on an objective control amount, that is, a moving direction, a moving distance, a moving speed, and the like of the movable table 2 be input into the driver circuit 41. Those pieces of information are generated as a drive control signal by a control unit 6 provided separately from the movable table 2 to be wirelessly transmitted from the control unit 6. The movable table 2 is mounted with a radio receiver portion 70 which receives the drive control signal. The drive control signal received by the radio receiver portion 70 is input into the driver circuit 41. Based on the drive control signal, the driver circuit 41 controls application of the voltage to the piezo linear motor 40. To the radio receiver portion 70, the DC voltage is applied from the rectifier circuit 52 of the non-contact power supply means 5. By this application, the radio receiver portion 70 detects the drive control signal which is wirelessly received thereby and transmits the drive control signal to the driver circuit 41.

Figure 6:
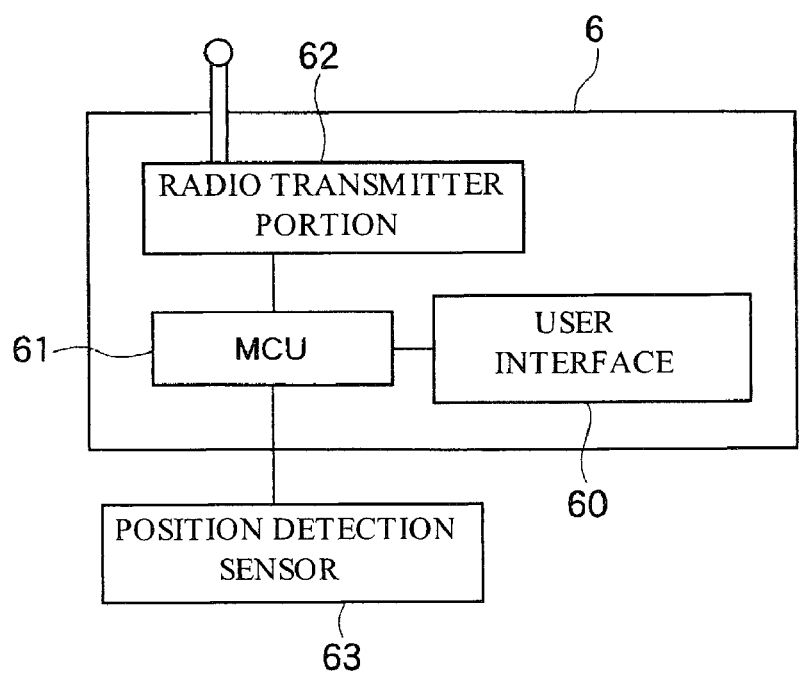
FIG. 6 is a block diagram illustrating a structure of a control unit according to the first embodiment of the present invention.

FIG. 6 is a block diagram schematically illustrating a structure of the control unit 6. The control unit 6 includes a user interface 60 through which a travel instruction for the movable table 2 is input by a user, a micro controller unit (MCU) 61 which executes a predetermined program which is stored therein in advance and generates the drive control signal based on the travel instruction information of the movable table 2, which is input through the user interface 60, and a radio transmitter portion 62 which transmits the drive control signal generated by the MCU 61. Further, to the control unit 6, an output signal of a position detection sensor 63 for detecting a travel position of the movable table 2 on the base 1 is input. The MCU 61 generates the drive control signal based on the travel instruction information input by the user and the output signal of the position detection sensor 63. The travel instruction information is input through a keyboard serving as the user interface 60. Further, the input travel instruction information and the travel position information of the movable table 2 detected by the position detection sensor 63 can be output, for recognition by the user, to the display device such as CRT or a liquid crystal display panel serving as the user interface 60.

The drive control signal generated by the MCU 61 is sent out from the radio transmitter portion 62. After being received by the radio receiver portion 70, the drive control signal is transmitted to the driver circuit 41 of the drive means 4. Accordingly, the control unit 6 can be used as a radio controller of the movable table 2. That is, there is no need of connecting a signal cable for controlling the drive means 4 to the movable table 2. Even when a moving distance of the movable table 2 is long, the movable table 2 is not interfered by the signal cable and can freely move along the track rails 1. In this case, the control unit 6 may be fixed to the base 1 or may be used by being carried by the user.

Figure 7:
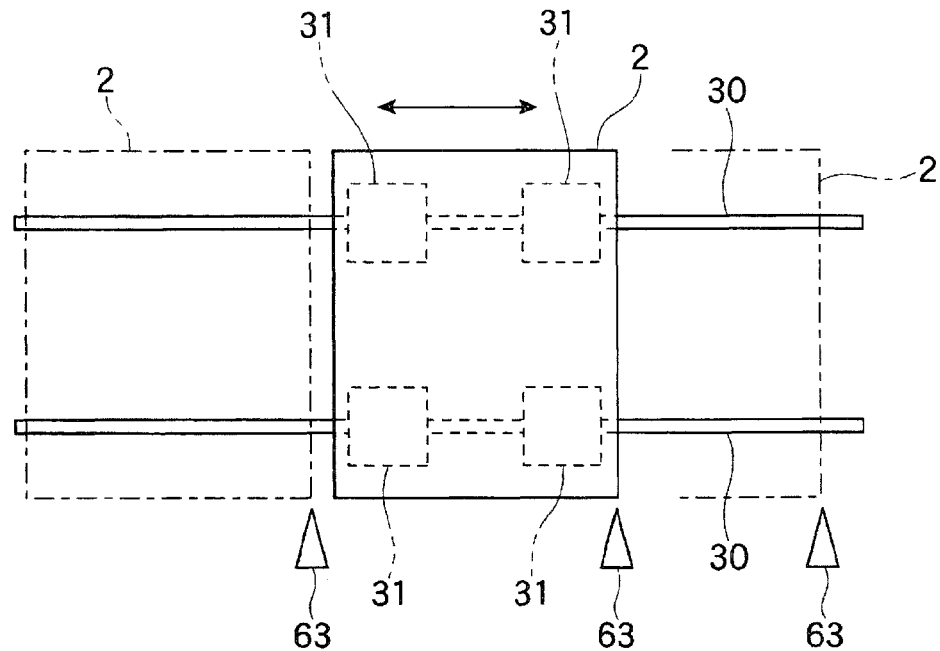
FIG. 7 is a plan view illustrating an arrangement example of a position detection sensor on a base.

The position detection sensor(s) 63 for detecting the travel position of the movable table 2 on the base 1 may be provided, for example, to one or a plurality of positions in the movement path of the movable table 2 on the base 1 as illustrated in FIG. 7. As the position detection sensor 63, there may be used a known sensor such as a photosensor, a magnetic sensor, or a proximity sensor. When the movable table 2 passes through or reaches a set position of the position detection sensor 63, the output signal of the position detection sensor 63 is inverted, thereby making it possible for the MCU 61 to know the travel position of the movable table 2. Based on the travel position, the MCU 61 can generate the drive control signal.

According to the actuator structured as described above, a need of a cable for supplying electric power or the drive control signal to the drive means 4 mounted on the movable table 2 is eliminated, thereby making it possible to enable the movable table 2 to travel by itself on the base 1 without connecting any cable to the movable table 2. Accordingly, even when the moving distance of the movable table 2 is long, the movable table 2 can be allowed to smoothly travel without dragging the cable.

Figure 8:
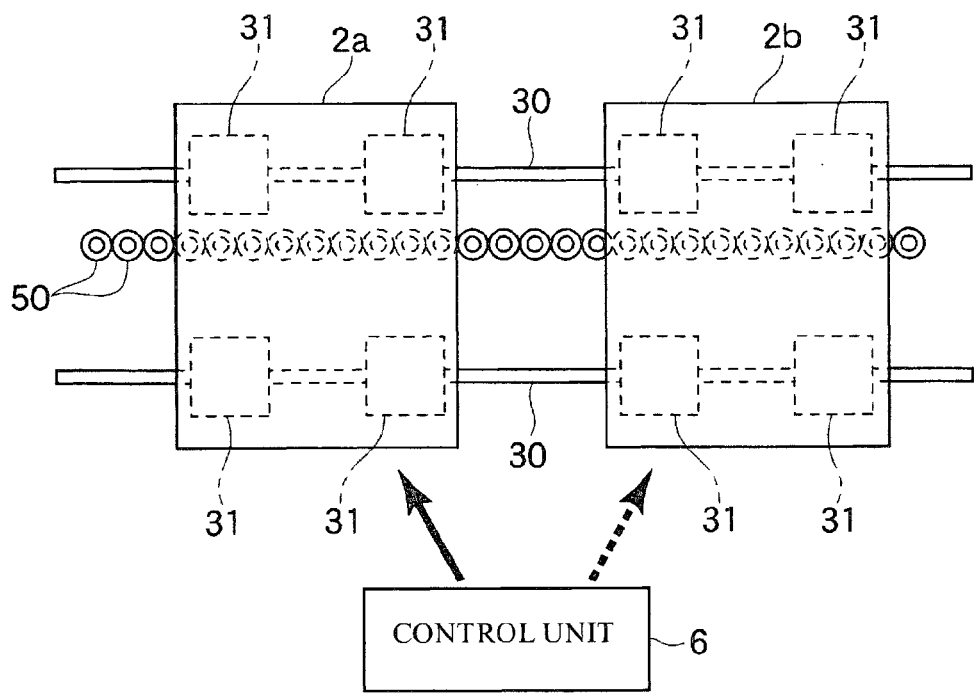
FIG. 8 is a plan view illustrating a state where a plurality of movable tables are assembled to track rails on the base.

In particular, the electric power and the drive control signal are supplied to the drive means 4 of the movable table 2 while being separated from each other. Accordingly, as illustrated in FIG. 8, for example, even when a plurality of movable tables 2a and 2b are assembled to the track rails 30 on the base 1, while the primary side member of the non-contact power supply means is commonly used thereby, traveling of each of the movable tables 2a and 2b can be controlled separately from each other, thereby being extremely advantageous in a case of applying the actuator to a conveying apparatus or the like. Further, in this case, frequencies of a transmission radio wave between the radio transmitter portion 62 and the radio receiver portion 70 are set for the movable tables so as to be different from each other, thereby making it possible to control the plurality of movable tables 2a and 2b by using the single control unit 6.

Note that, in the example of the wireless actuator as described above, the movable table 2 performs linear reciprocating movement with respect to the base 1. However, this is not obligatory. The movable table 2 may travel along a curved movement path on the base 1 or may travel along a movement path including linear and curved portions.

Figure 9:
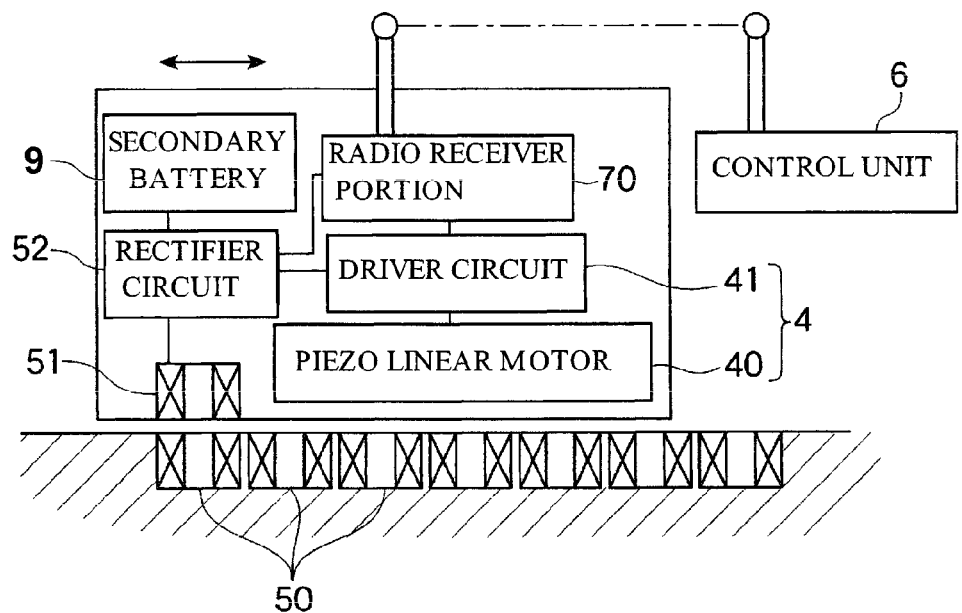
FIG. 9 is a block diagram illustrating an example in which a secondary battery is mounted on the movable table according to the first embodiment of the present invention.

Further, in the block diagram illustrated in FIG. 6, after the electromotive force generated in the secondary side member 51 of the non-contact power supply means 5 is converted into the DC voltage by the rectifier circuit 52, the DC voltage is directly supplied to the driver circuit 41 of the drive means 4 and the radio receiver portion 70. However, as illustrated in FIG. 9, there may be employed a structure in which a secondary battery 9 for back up is mounted on the movable table 2. That is, there is realized a structure in which the secondary battery 9 is connected to the rectifier circuit 52, and while the secondary battery 9 is charged with electric power transferred by the non-contact power supply means 5, the DC voltage may also be applied from the secondary battery 9 to the driver circuit 41 of the drive means 4 and the radio receiver portion 70. As described above, with the structure in which the secondary battery 9 for back up is mounted on the movable table 2 and is always charged by the non-contact power supply means 5, even when transfer of the electric power from the base 1 to the movable table 2 is shut off due to, for example, unexpected power outage, the electric power can be continuously supplied to the drive means 4, thereby making it possible to automatically perform procedure of, for example, retreating the movable table 2 to an initial position on the base 1.

Figure 10:
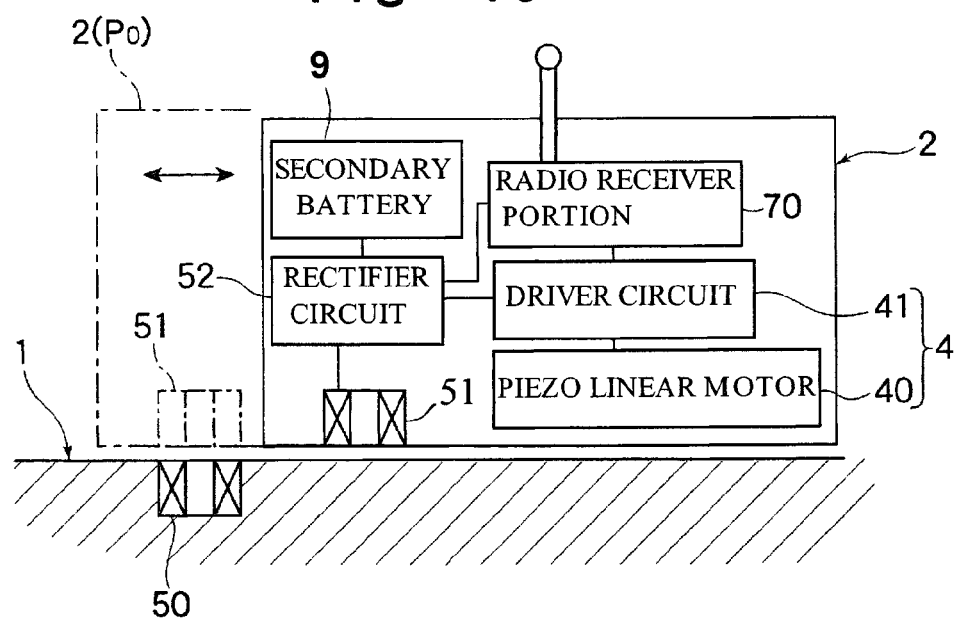
FIG. 10 is a block diagram illustrating elements mounted on a movable table of a wireless actuator according to a second embodiment of the present invention.

On the other hand, FIG. 10 illustrates a wireless actuator according to a second embodiment of the present invention. In the first embodiment of the present invention described above, even in the case where the coils constituting the primary side member 50 of the non-contact power supply means 5 are arranged on the base 1 along the track rails 30 and the movable table 2 moves on the base 1, the secondary side member 51 mounted on the movable table 2 is always opposed to the primary side member 50. As a result, in the first embodiment, even when the movable table 2 travels anywhere on the base 1, the electric power can be transferred from the base 1 side to the movable table 2 side. However, with the structure in which the primary side member 50 is arranged in a continuous manner along the track rails 30, when the movement path of the movable table 2 is long, manufacture of the base 1 consumes labor, thereby causing increase in cost.

In the second embodiment illustrated in FIG. 10, the secondary battery 9 is mounted on the movable table 2 and the primary side member 50 of the non-contact power supply means 5 is provided only to one or a plurality of specific positions on the base 1. Accordingly, when the movable table 2 is stopped at the specific position, the secondary battery 9 is charged. Other constructions are the same as those of the first embodiment. That is, components mounted on the movable table 2 are exactly the same as those described in the example with reference to FIG. 9.

As illustrated in FIG. 10, the primary side member 50 of the non-contact power supply means 5 is provided to the base 1 so as to correspond to a charging position $P_0$ of the movable table 2 on the base 1. Accordingly, while the movable table 2 is being set in the charging position $P_0$, the primary side member 50 provided to the base 1 and the secondary side member 51 mounted on the movable table 2 are opposed to each other. By applying an AC voltage to the primary side member 50, an electromotive force is generated in the secondary side member 51 and a DC voltage can be applied to the secondary battery 9 through the rectifier circuit 52. As a result, while the movable table 2 is being stopped at the charging position $P_0$, the secondary battery 9 can be charged. When the secondary battery 9 is charged in this manner, electric power is supplied from the secondary battery 9 to the driver circuit 41 of the drive means 4 and the radio receiver portion 70, thereby making it possible to travel the movable table 2 from the charging position $P_0$ to another position along the track rails 30.

For example, in a method of using the actuator in a machine tool or a conveying apparatus, the movable table 2 is allowed to repeatedly execute jobs including specific processes in most cases. During intervals between two successive jobs, the movable table 2 is often reset to an initial position which is a home position. Further, even during the job, an operation is performed for a conveyed product placed on the movable table 2, so the movable table 2 may often be stopped at a specific position for a short period of time. Accordingly, when the one or plurality of position(s) at which the movable table 2 is often stopped on the base 1 is/are set as the charging position(s) $P_0$, the secondary battery 9 mounted on the movable table 2 can often be charged, thereby making it possible to continuously travel the movable table 2 on the base 1 only with the electric power supplied from the secondary battery.

According to the wireless actuator according to the second embodiment structured as described above, with the provision of the primary side member 50 of the non-contact power supply means 5 only to the one or plurality of position(s) on the base 1, the movable table 2 can be allowed to travel thereon. Accordingly, as compared to the actuator of the above first embodiment, machining of the base 1 can be facilitated, thereby enabling the manufacture at lower cost.

Next, a description is made of a wireless actuator according to a third embodiment of the present invention. In the above first embodiment, the position detection sensor(s) 63 for detecting the travel position of the movable table 2 is provided to the one or plurality of position(s) on the base 1. However, with this structure, the travel position of the movable table 2 can be known only intermittently. Accordingly, the movable table 2 can only be allowed to perform a job of one kind corresponding to the set position of the position detection sensor 63. That is, in order to allow the movable table 2 to perform jobs including different travel processes, setups of changing the set position of the position detection sensor 63 are required.

Figure 11:
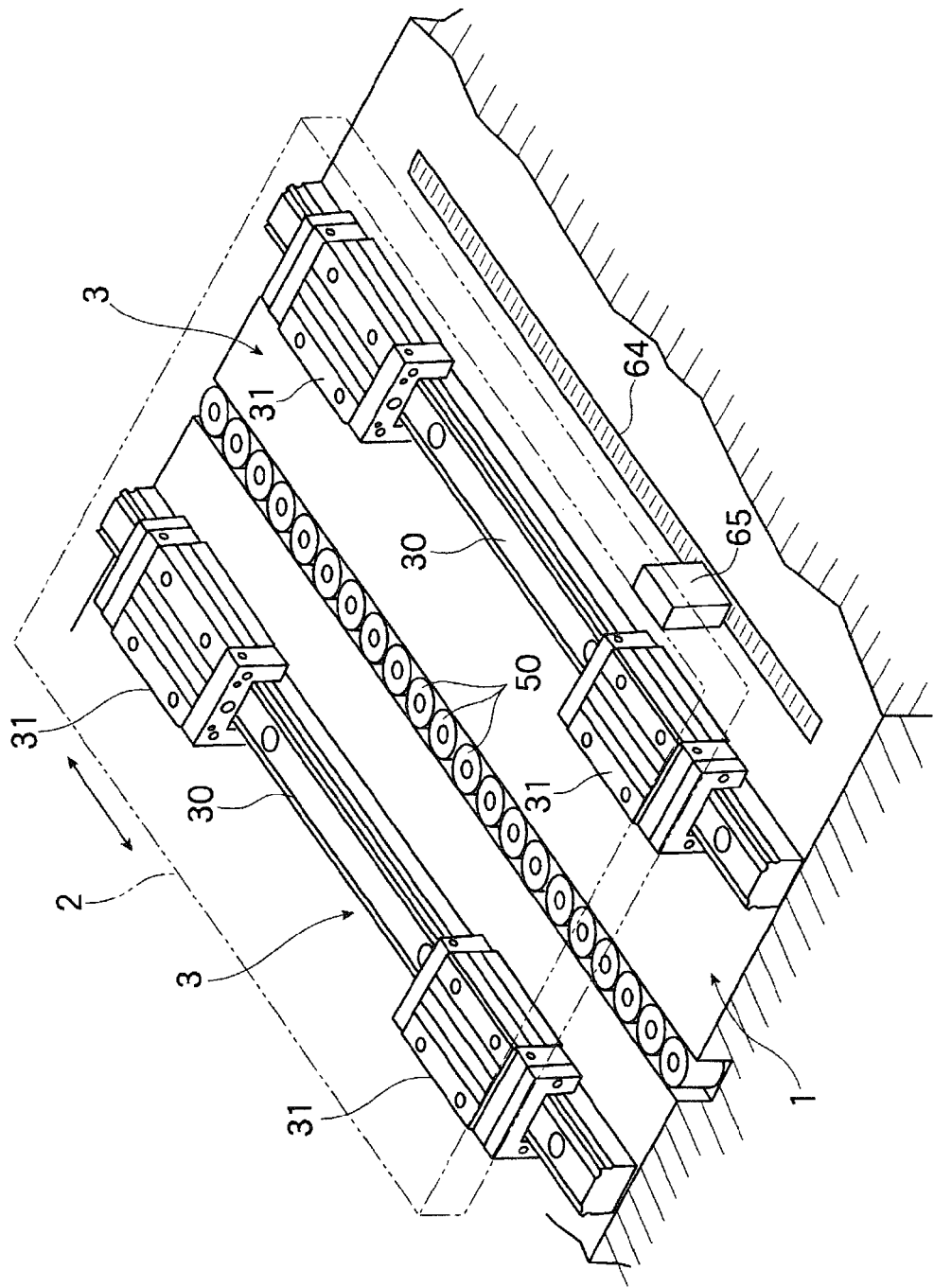
FIG. 11 is a perspective view illustrating a structure for guiding a movable table of a wireless actuator according to a third embodiment of the present invention.

In view of those problems, in the actuator according to the third embodiment described below, as illustrated in FIG. 11, there is adopted a structure in which a scale 64 is provided to the base 1, an encoder 65 for reading the scale 64 is provided to the movable table 2, and an output signal of the encoder 65 is wirelessly transmitted to the control unit 6.

The scale 64 may be any scale such as an optical scale or a magnetic scale, having a continuous ladder pattern of a predetermined pitch, and is fixed to the base 1 along the track rail 30. The encoder 65 is fixed to the movable table 2, reads the ladder pattern formed on the scale 64 along with the movement of the movable table 2, and outputs a pulse signal corresponding to the ladder pattern.

Figure 12:
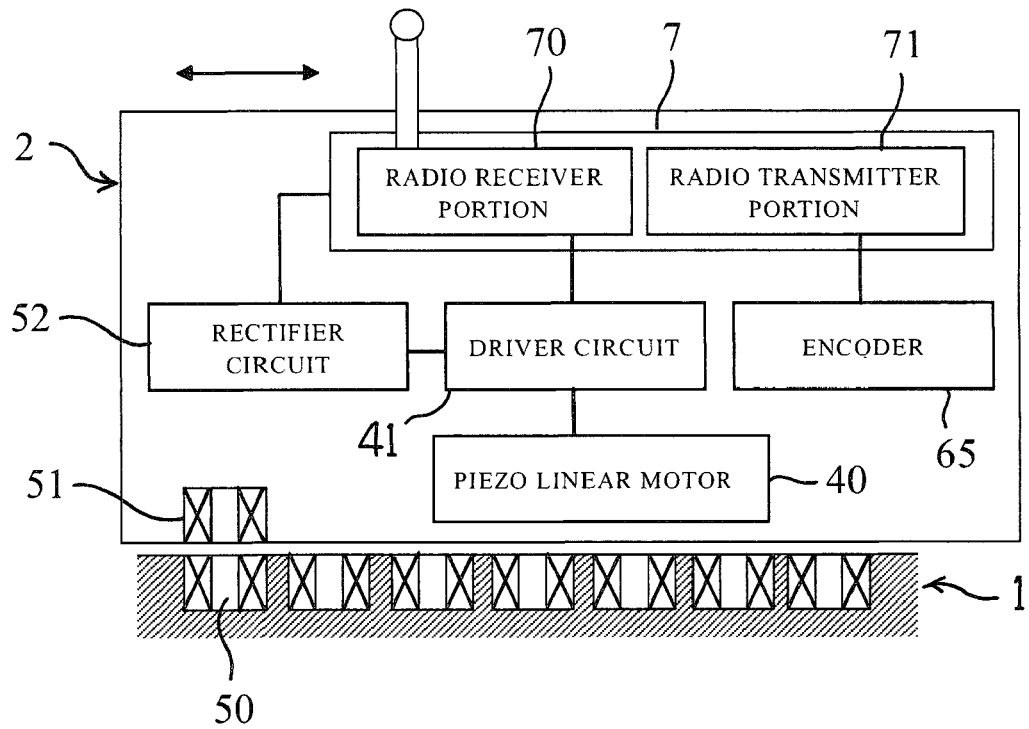
FIG. 12 is a block diagram illustrating elements mounted on the movable table according to the third embodiment of the present invention.

FIG. 12 is a block diagram illustrating a structure of the components mounted on the movable table 2. The encoder 65 is mounted on the movable table 2. However, the output signal of the encoder 65 is required when the MCU 61 of the control unit 6 generates the drive control signal. Accordingly, a radio transmitter portion 71 is provided to the movable table 2. The output signal of the encoder 65 is transmitted to the control unit 6 by the radio transmitter portion 71. Further, the radio transmitter portion 71 constitutes together with the above-mentioned radio receiver portion 70 a transmitter receiver 7 on the movable table 2. A DC voltage generated by the rectifier circuit 52 of the non-contact power supply means 5 is applied to the transmitter receiver 7. As a result, the radio transmitter portion 71 and the radio receiver portion 70 which are provided to the transmitter receiver 7 perform operations. Other constructions of the components mounted on the movable table 2 are the same as those of the above first embodiment. That is, the electromotive force generated in the secondary side member 51 of the non-contact power supply means 5 is converted into the DC voltage by the rectifier circuit 52, and the DC voltage is applied to the driver circuit 41. The driver circuit 41 receives the drive control signal from the radio receiver portion 70 and appropriately applies a voltage to the piezo linear motor 40. As a result, the piezo linear motor 40 is operated to allow the movable table 2 to advance along the track rails 30 on the base 1.

Figure 13:
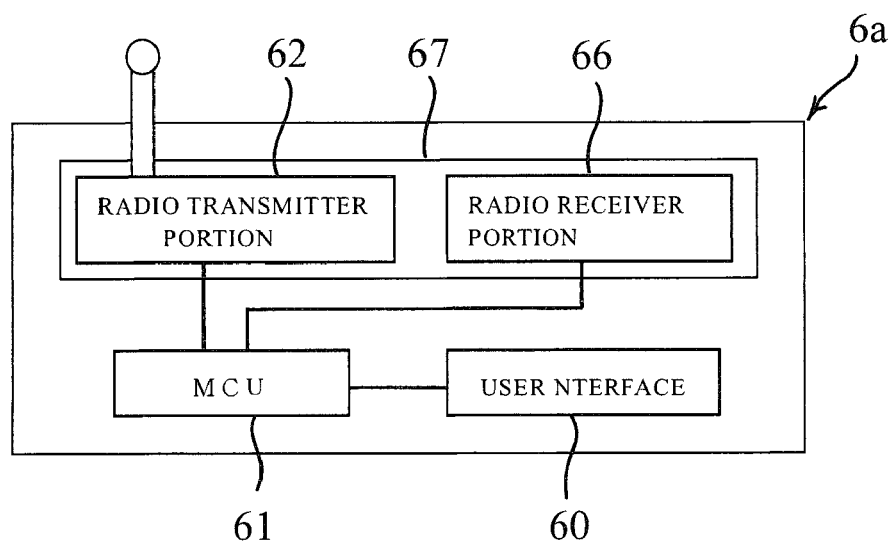
FIG. 13 is a block diagram illustrating a structure of a control unit according to the third embodiment of the present invention.

On the other hand, FIG. 13 is a block diagram illustrating a control unit 6a according to the third embodiment of the present invention. The control unit 6a includes a radio receiver portion 66 and can receive the output signal of the encoder 65 wirelessly transmitted from the movable table 2. The radio receiver portion 66 constitutes together with the radio transmitter portion 62 a transmitter receiver 67 in the control unit 6a. The output signal of the encoder 65, which is received by the radio receiver portion 66, is read by the MCU 61. The output signal of the encoder 65 is a pulse signal corresponding to the ladder pattern of the scale 64. Accordingly, the MCU 61 counts the pulse signal, thereby making it possible to know a travel distance and a travel speed of the movable table 2. Further, similarly to the above first embodiment, the travel instruction information is input from the user interface 60 to the MCU 61. The MCU 61 generates the drive control signal based on input information from the radio receiver portion 66 and the user interface 60. The drive control signal generated by the MCU 61 is transmitted to the radio receiver portion 70 of the movable table 2 through the radio transmitter portion 62.

As a result, the operation of the drive means 4 of the movable table 2 is controlled. Without connecting cables such as a power cable and a signal cable to the movable table 2, the movable table 2 can be allowed to travel on the base 1 based on the travel instruction information. Further, information indicating a travel distance and a travel speed of the movable table 2 is wirelessly transmitted from the movable table 2 to the control unit 6a. Accordingly, when the travel instruction information input to the control unit 6a is changed, a movement of the movable table 2 on the base 1 can be freely changed. Therefore, without performing any operation with respect to the base 1 and the movable table 2, it is possible to allow the actuator to flexibly respond to jobs of several kinds including different travel processes.

Figure 14:
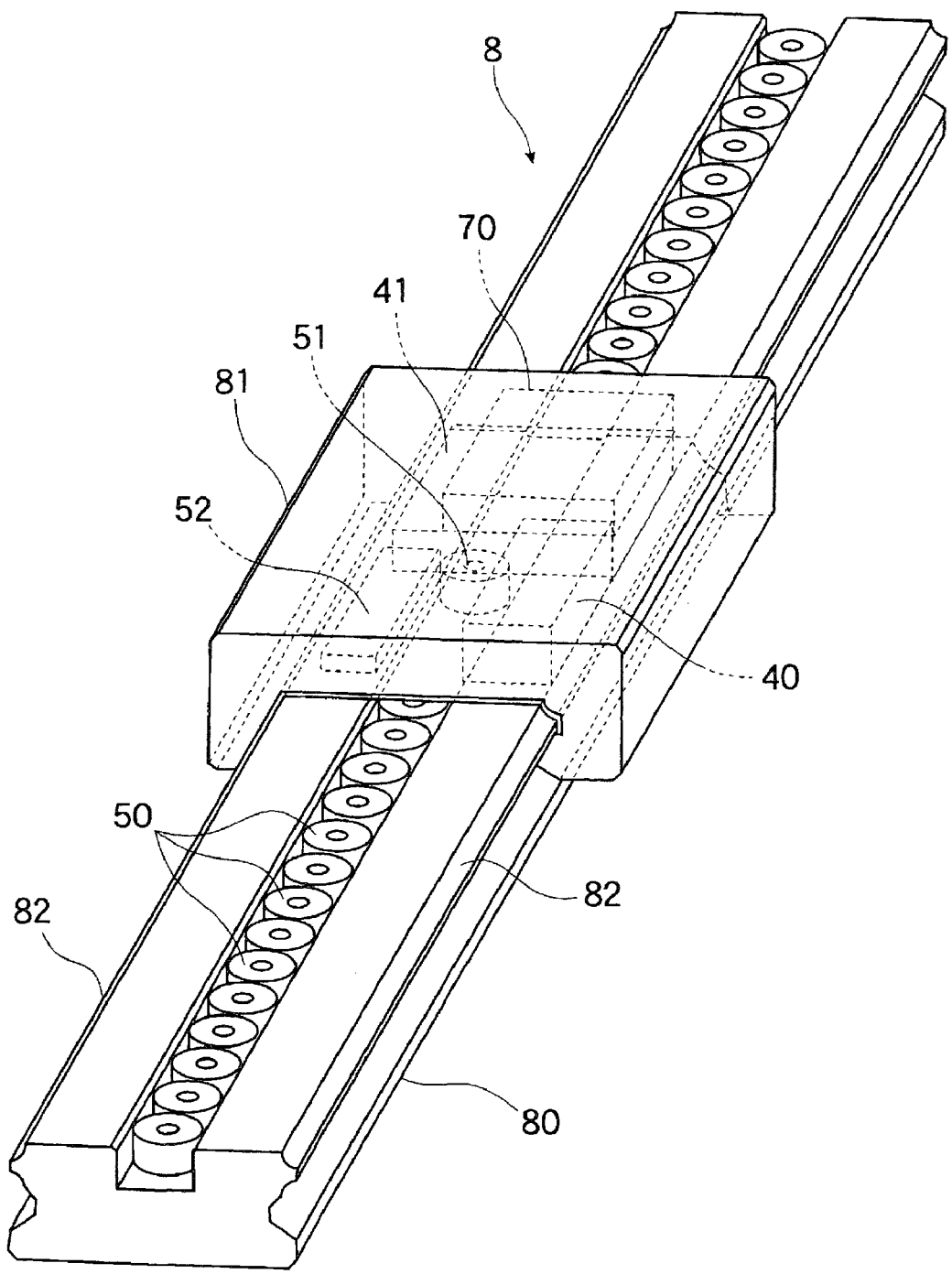
FIG. 14 is a perspective view illustrating a wireless actuator according to a fourth embodiment of the present invention.

FIG. 14 illustrates a wireless actuator according to a fourth embodiment of the present invention. In the above embodiments, a movement of the movable table 2 is supported by the linear guides 3 arranged on the base 1, and the drive means 4, the radio receiver portion 70, and the non-contact power supply means 5 are provided to the movable table 2 and the base 1. However, in the fourth embodiment, in order to further downsize the wireless actuator, the drive means 4, the radio receiver portion 70, and the non-contact power supply means 5 are incorporated into a linear guide 8 itself, including a track rail 80 and a slide member 81. That is, the slide member 81 of the linear guide 8 corresponds to the movable table according to the present invention, and the track rail 80 of the linear guide 8 corresponds to the base according to the present invention.

As illustrated in FIG. 14, the track rail 80 includes ball rolling surfaces 82 on both side surfaces thereof. The slide member 81 is assembled to the track rail 80 through intermediation of multiple balls (not shown) rolling on the ball rolling surfaces 82. With this structure, the slide member 81 is movable along a longitudinal direction of the track rail 80. At a center in a width direction on an upper surface of the track rail 80, there is formed a groove continuous in the longitudinal direction thereof. In the groove, multiple coils are arranged in one line, constituting the primary side member 50 of the non-contact power supply means 5. On the other hand, on the slide member 81, a coil constituting the secondary side member 51 of the non-contact power supply means is disposed at a position opposed to the primary side member 50. Even when the slide member 81 moves along the track rail 80, the secondary side member 51 is continuously opposed to the primary side member 50. Further, the slide member 81 has the piezo linear motor 40 as the drive means 4 and the driver circuit 41. The tip of the drive leg of the piezo linear motor 40 is brought into contact with the upper surface of the track rail 80. Further, the slide member 81 includes the rectifier circuit 52 for converting the electromotive force generated in the secondary side member 51 into the DC voltage and the radio receiver portion 70 which receives the drive control signal transmitted from the control unit 6 and transmits the drive control signal to the driver circuit 41. That is, elements to be mounted on the slide member 81 are the same as those mounted on the movable table 2 in FIG. 5.

Note that, the structure of the control unit 6 which transmits the drive control signal to the radio receiver portion 70 of the movable table 2 is the same as that of the first embodiment, and a detailed description thereof is omitted.

Accordingly, in the wireless actuator according to the fourth embodiment, similarly to the above first embodiment, by inputting the travel instruction information of the movable table to the control unit 6, the slide member 81 of the linear guide 8 is allowed to reciprocate on the track rail 80 according to the travel instruction information. However, all the elements are incorporated into the track rail 80 and the slide member 81 of the linear guide 8, so the wireless actuator of this embodiment is extremely compact compared with the wireless actuator of the above first embodiment. For example, in a case of application to devices with relatively light load such as various inspection devices, the wireless actuator can contribute to downsizing of the device.

Further, in a case where the linear guide itself is structured as the wireless actuator, all the embodiments described above with reference to FIGS. 1 to 13 can be applied as they are to the linear guide. That is, there can be achieved a structure in which the movable table 2 is replaced with the slide member and the base 1 is replaced with the track rail. In both cases, an extremely compact wireless actuator can be provided.

The invention claimed is:

1. A wireless actuator comprising:
    a base including a track rail arranged along a predetermined path;
    a movable table which includes a slide member assembled to the track rail through intermediation of multiple balls and which is movable along the track rail;
    a drive means which is mounted on the movable table and which allows the movable table to travel with respect to the track rail;
    a radio receiver portion which is mounted on the movable table and which receives a drive control signal for the drive means;
    a control unit which generates the drive control signal for the drive means and wirelessly transmits the drive control signal to the radio receiver portion; and
    a non-contact power supply means which includes a primary side member provided to the base and a secondary side member provided to the movable table and which supplies electric power from the primary side member of the base through the secondary side member to the drive means and the radio receiver portion which are mounted on the movable table and which are connected to the secondary side member.

2. The wireless actuator according to claim 1, wherein:
    the primary side member and the secondary side member of the non-contact power supply means comprise coil members which are opposed to each other, respectively; and
    electric power is supplied from the primary side member to the secondary side member by an electromagnetic induction method.

3. The wireless actuator according to claim 1, wherein the primary side member of the non-contact power supply means is provided over an entire length of a movement path of the movable table on the base.

4. The wireless actuator according to claim 1, wherein the movable table (2) has a secondary battery (9) mounted thereon and connected to the secondary side member, for supplying electric power to the drive means and the radio receiver portion, the secondary battery (9) being charged by the secondary side member of the non-contact power supply means (5).

5. The wireless actuator according to claim 4, wherein:
    the movement path of the movable table on the base has therein at least one charging position for the secondary battery; and
    the primary side member of the non-contact power supply means is provided at the charging position.

6. The wireless actuator according to claim 1, wherein:
    the base has a position detection sensor provided thereon, which detects a travel position of the movable table on the base; and
    the control unit takes in an output signal of the position detection sensor and generates the drive control signal.

7. The wireless actuator according to claim 1, wherein:
    the base has a scale provided along the track rail;
    the movable table has an encoder which is mounted thereon and which reads the scale;
    the movable table also has a radio transmitter portion which transmits an output signal of the encoder to the control unit; and
    the control unit takes in the output signal of the encoder input thereto through the radio receiver portion and generates the drive control signal.

8. The wireless actuator according to claim 1, wherein the movable table provided to the base comprises a plurality of movable tables which are movable along a single path, traveling of the plurality of movable tables being independently controlled.

9. The wireless actuator according to claim 1, wherein:
    the drive means, the radio receiver portion, and the secondary side member of the non-contact power supply means are incorporated in the slide member; and
    the primary side member of the non-contact power supply means is incorporated in the track rail.

* * * * *